United States Patent [19]

Saunders

[11] 4,404,836
[45] Sep. 20, 1983

[54] METAL CONTAINER EDGE TRIMMING METHOD AND APPARATUS

[75] Inventor: William T. Saunders, Weirton, W. Va.

[73] Assignee: National Steel Corporation, Pittsburgh, Pa.

[21] Appl. No.: 327,802

[22] Filed: Dec. 7, 1981

[51] Int. Cl.³ .......................................... B21D 24/16
[52] U.S. Cl. ..................................... 72/332; 72/338; 83/591; 83/593; 83/914
[58] Field of Search ................ 83/591, 593, 594, 598, 83/610, 914; 72/332, 338, 347, 348

[56] References Cited

U.S. PATENT DOCUMENTS

| | | | |
|---|---|---|---|
| 814,813 | 3/1906 | Swift, Jr. | 83/594 |
| 1,394,911 | 10/1921 | King | 83/591 |
| 1,495,999 | 6/1924 | Gruman | 83/591 |
| 1,756,826 | 4/1930 | Hoopes | 83/591 |
| 2,074,547 | 3/1937 | Hessenbruch | 164/48 |
| 2,321,085 | 6/1943 | Hubbard | 29/148.2 |
| 2,526,336 | 10/1950 | Diekmann et al. | 164/47 |
| 2,875,511 | 3/1959 | Hawes | 29/190 |
| 3,312,098 | 4/1967 | Henrickson et al. | 72/349 |
| 3,372,569 | 3/1968 | Bozek | 72/334 |
| 3,855,862 | 12/1974 | Moller | 73/334 |
| 3,881,380 | 5/1975 | Paramonoff | 83/150 |
| 3,913,372 | 10/1975 | Baker | 72/349 |
| 4,257,293 | 3/1981 | Stahl | 83/193 |

Primary Examiner—Lowell A. Larson
Attorney, Agent, or Firm—Paul T. O'Neil

[57] ABSTRACT

An improved apparatus for and a method of trimming an outwardly directed flange at the end of a metal container body and severing the ring of scrap removed employs two substantially semicircular concave cutters supported for rotation about spaced parallel axes disposed substantially in the plane of the flange to be trimmed and driven for rotation about their respective axes to engage the flange substantially simultaneously to sever the scrap ring around substantially the entire periphery of the container. The ring of scrap is cut into four pieces either by initially die-cutting or otherwise removing segments from opposed sides of the flange tangent to the trim line prior to engagement by the rotating arcuate cutters or alternatively, the arcuate cutters may sever the scrap as a complete ring and sever the ring into pieces upon continued movement in their arcuate paths past a stationary clipper block spaced below the container flange. The container is preferably trimmed with the open end facing downward, with the arcuate cutters rotated to propel the trimmed scrap downward for easy removal without interfering with operation of the apparatus or feed of the containers.

27 Claims, 13 Drawing Figures

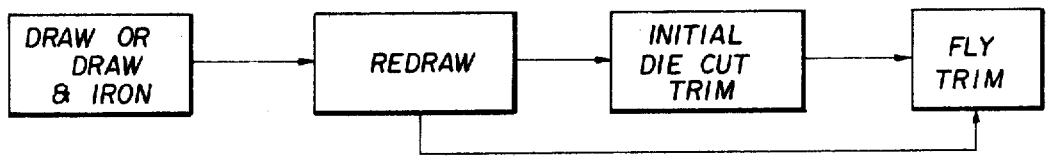
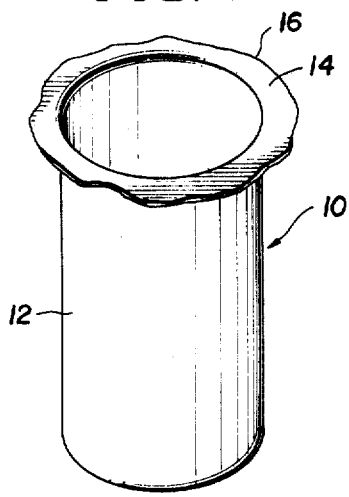
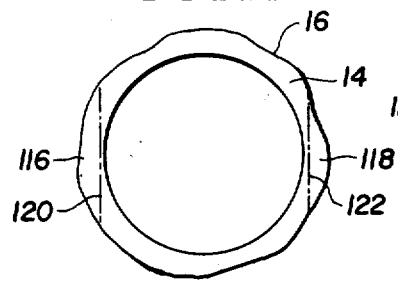
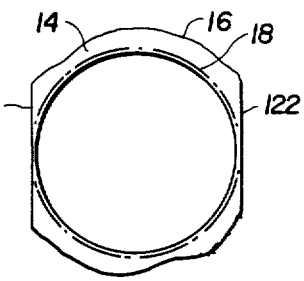
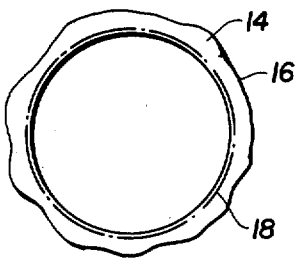
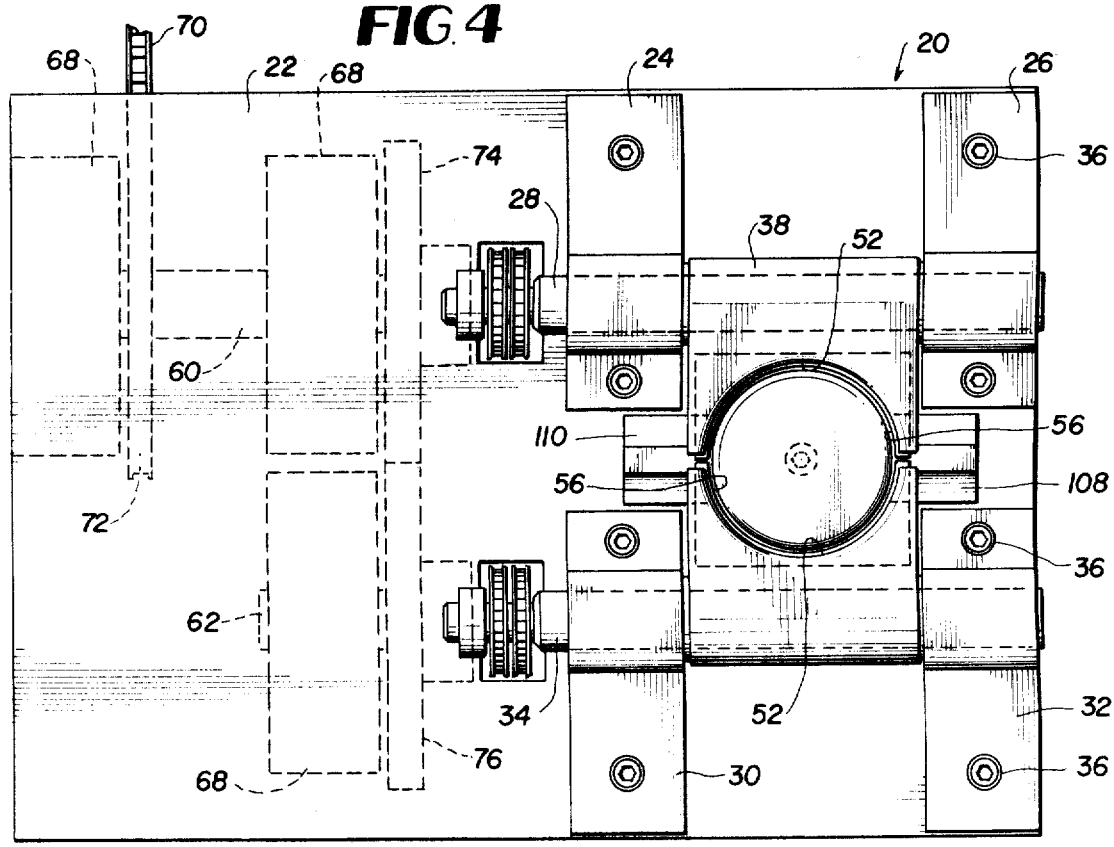

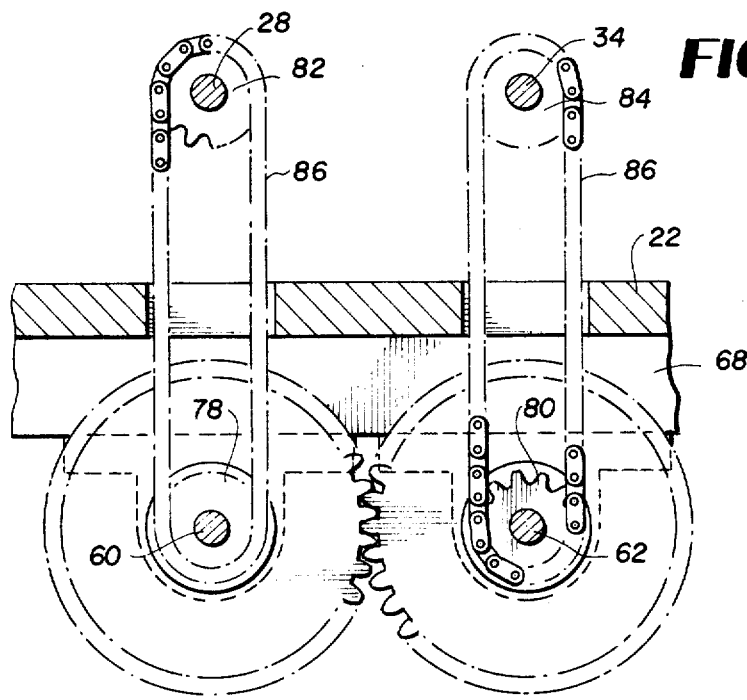
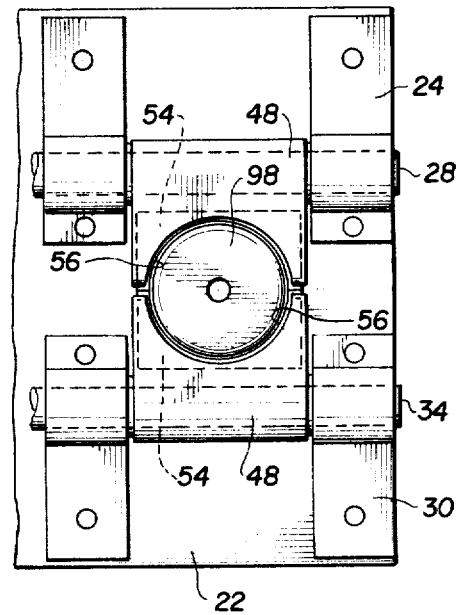
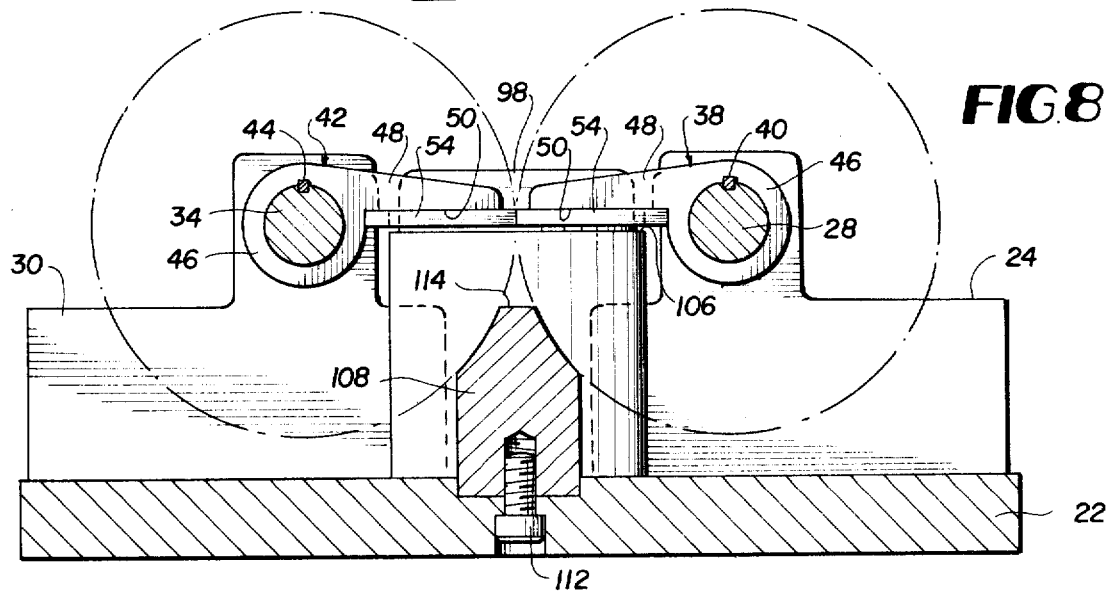

METAL CONTAINER EDGE TRIMMING METHOD AND APPARATUS

BACKGROUND OF THE INVENTION

1. Field of the Invention

This invention relates to a method of and apparatus for trimming metal containers and more particularly to a method of and apparatus for trimming excess metal from a flange at the open top end of a drawn cup shaped article.

2. Description of the Prior Art

Metal containers formed by a deep draw process have uneven edges which must be trimmed following the drawing operation. Trimming such edges has presented problems, particularly in the high-speed production of one-piece container bodies such as metal cups and cans used in the packaging of foods, beverages and the like. The excess metal at the uneven top edges of such containers is conventionally removed in an annular ring by a die cutting operation at the end of the final drawing step, or by a spin cutting operation following the final drawing step. Removal of the waste trim ring has presented problems particularly since the cutting operation normally leaves the ring telescoped over a part of the apparatus. Removal of the trim ring can also interfere with removal of the trimmed container body from the apparatus and with positioning the next container, or container blank, in the apparatus.

Following the trimming operation in the forming of single piece can bodies, the open top of the trimmed container is normally flanged, i.e., a narrow, outwardly directed flange is formed at the open top to facilitate closing the filled container with a metal closure panel by a roll seaming operation. It has also been known to form the closure attachment flange by terminating the final drawing step prior to drawing all of the metal into the die, thereby leaving a relatively wide flange, which includes the scrap which is to be removed, then trimming the flange in a die cutting operation. Such a trimming operation is disclosed in U.S. Pat. No. 3,855,862 wherein the sidewalls are initially ironed at a diameter greater than desired for the finished container, and then redrawn to reduce the diameter and form the flange which is trimmed at the end of the final draw. The scrap ring is removed in one piece by a die cutting operation, leaving the desired flange in the previously ironed sidewall metal at the open top. Again, the one-piece trim ring presented problems of removal and disposal.

Attempts have been made to remove the trim metal from the top of a deep drawn container in sections to facilitate removing and handling of the severed scrap. One such prior art device is disclosed in U.S. Pat. No. 2,074,547 wherein the excess, uneven material is removed from the open top of the container by a pair of shearing dies moved substantially perpendicular to the axis of the container by a camming operation. Thereafter a second pair of cutters are moved substantially perpendicular to the direction of movement of the cam actuated shears to slit the severed ring into two segments to facilitate scrap removal. This apparatus was necessarily relatively slow and unsuited for present day high-speed can forming apparatus.

Another prior art device for trimming drawn containers is disclosed in U.S. Pat. No. 4,257,293 and includes a plurality of cam actuated cutters disposed radially around a mandrel supporting a can to be trimmed. The cams are actuated in sequence to move the cutters into engagement with and trim the waste material which is permitted to fall into a removal chute.

U.S. Pat. No. 3,913,372 discloses apparatus for forming a container closure from a flat metal blank by a punch and die operation and for removing an annular wastage ring from the formed closure. The severed ring is cut into segments for removal by pressing the ring against spaced cutters located around the forming die.

U.S. Pat. No. 3,881,380 discloses mechanism for trimming the open end of a one-piece metallic can body supported on a mandrel by initially cutting a scrap ring from the open end of the supported can and thereafter actuating two scissors-like nipper devices located on opposite sides of the mandrel to sever the scrap ring into two pieces which are permitted to fall into a scrap disposal chute.

SUMMARY OF THE INVENTION

While the present invention may be used in the production of any drawn container having a flange at its open end, it is particularly well suited for the high-speed production of one-piece can bodies having a closure attachment flange at their open end. Accordingly, the invention will be described herein with reference to forming can bodies, it being understood that the invention is not so limited. While the prior art discloses numerous devices for trimming the open end of drawn metal containers, these prior art devices have not been entirely satisfactory, particularly in the high-speed production of one-piece metal can bodies. Accordingly, it is a primary object of the present invention to provide an improved method of and apparatus for trimming the open end of a drawn container and of disposing of the scrap.

Another object is to provide such a method and apparatus for forming a one-piece drawn can body with a flange at the open end, which flange includes waste metal to be removed by trimming, and for thereafter trimming the waste metal from the flange and severing such waste metal into a plurality of pieces for easy removal.

Another object is to provide such a method of and apparatus for trimming such a drawn metal can body utilizing a pair of arcuate cutters supported for rotation about spaced, generally parallel axes disposed in a plane perpendicular to the axis of the metal can, and rotating the arcuate cutters to simultaneously engage the flange and form two arcuate cuts, each of substantially 180°, in the flange to remove the waste metal in a generally axial direction relative to the can body.

In the attainment of the foregoing and other objects and advantages of the invention, an important feature resides in forming a one-piece can body in a drawing operation, leaving an outwardly directed flange at the open top, with the flange containing the waste metal to be trimmed and removed as scrap. The scrap is removed, leaving only the portion of the flange metal desired for incorporation in a rolled seam with a closure panel. The trimming operation may be accomplished in a single step wherein the trim material is removed in the form of an annular ring and subsequently severed into two or four pieces by continued movement of the trim cutters. Alternatively, two substantially diametrically opposed segments of the trim material may initially be removed and thereafter the remaining portion of the trim material removed in two pieces substantially simultaneously.

In the preferred embodiment, a drawn can body having an untrimmed flange at its open end is positioned, preferably open end down, on a cylindrical pilot or mandrel to accurately locate the can body relative to a pair of rotary cutters. An annular stop surrounding the mandrel engages the flange adjacent its inner periphery and acts both to axially position the can and as a stationary shear element which cooperates with rotating cutters to trim the excess flange metal.

The cutters are mounted for rotation about spaced parallel axes disposed in a plane perpendicular to the longitudinal axis of the can body, one on each side thereof. The cutters have concave arcuate cutting edges, each extending through approximately 180° and are driven to engage the flange material substantially simultaneously so that the waste metal is removed in an annular ring. Continued rotation of the cutters carrys the trim ring away from the trimmed can body which may be immediately removed from the mandrel in preparation for a second can to be trimmed. A stationary anvil extending generally parallel to the axes of rotation of the cutters and spaced therebelow is positioned to cooperate with the rotating cutters to sever the trim ring into two or four segments which are permitted to fall by gravity for collection and removal by any suitable means.

In an alternative embodiment, two segments of the waste flange material are initially removed for example by a die-cutting operation either at the conclusion of the drawing step or at a trimming station located ahead of the rotating cutters in the can forming line. The segments removed preferably are cut along parallel straight lines tangent to the final trim line on opposite sides of the can body. Thereafter, the can is positioned on the pilot as described above, with the first trim lines extending perpendicular to the axis of rotation of the rotating cutters. The final trimming operation is then completed by rotation of the arcuate cutters which each remove an arcuate section of the flange terminating substantially at the point of tangency of the original cut lines. In this embodiment, the anvil is not required to further cut the trim ring.

BRIEF DESCRIPTION OF THE DRAWINGS

Other features and advantages of the invention will become apparent from the detailed description contained hereinbelow, taken in conjunction with the drawings, in which:

FIG. 1 is a block diagram schematically illustrating the sequence of operation in forming and trimming containers in accordance with the present invention;

FIG. 2 is an isometric view of a one-piece deep drawn container having a flange containing waste material to be trimmed from the open end;

FIG. 3 is a top plan view of the container shown in FIG. 2 and illustrating the trim line for removal of the waste portion of the flange;

FIG. 4 is a top plan view of a trimming apparatus employing two rotating cutters according to the present invention;

FIG. 7 is a fragmentary sectional view taken along line 7—7 of FIG. 5;

FIG. 8 is a fragmentary sectional view taken along line 8—8 of FIG. 5;

FIG. 9 is a fragmentary top plan view, showing apparatus for initially removing two segments of the waste material from the flange;

FIG. 11 is a top plan view of the can shown in FIG. 2 and illustrating the initial trim lines wherein the scrap material is removed from the flange in four separate pieces;

FIG. 12 is a view similar to FIG. 11 and showing the can after the initial trimming operation; and FIG. 13 is a fragmentary top plan view similar to FIG. 4 and showing an alternate embodiment of the invention.

DESCRIPTION OF THE PREFERRED EMBODIMENTS

Figure 10:
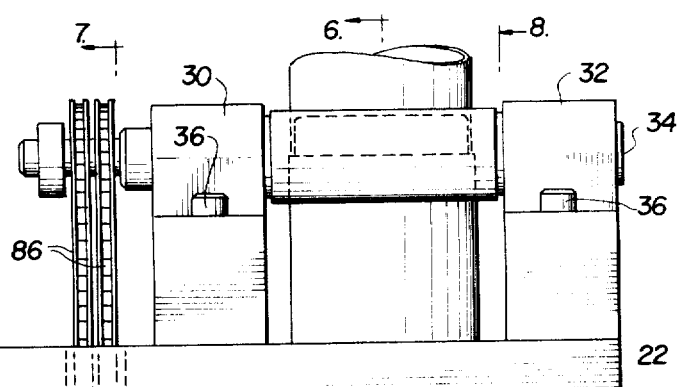
FIG. 10 is a fragmentary sectional view taken along line 10—10 of FIG. 9.
Figure 5:
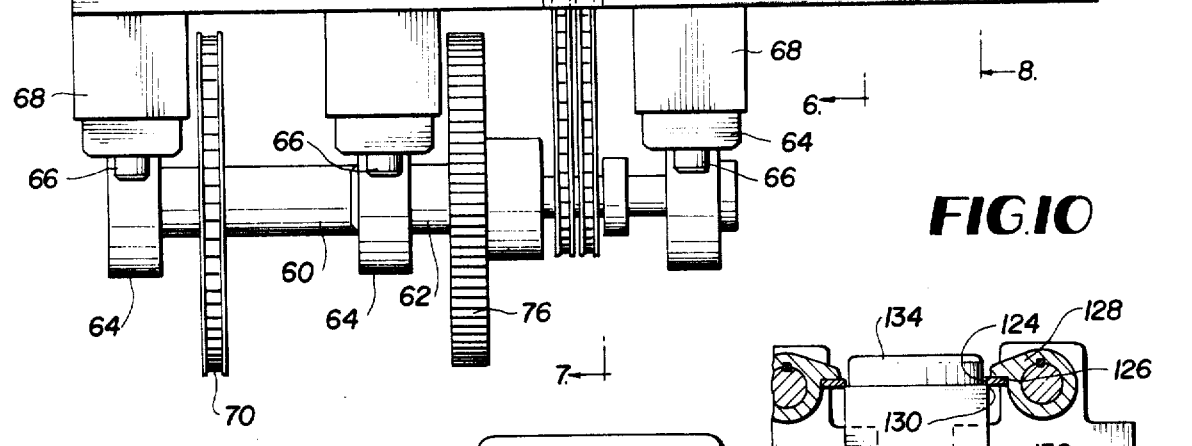
FIG. 5 is a side elevation view of the apparatus shown in FIG. 4.

Referring now to the drawings in detail, a method of forming one-piece can bodies having an outwardly directed closure attachment flange at their open end is schematically illustrated in the block diagram of FIG. 1. The initial step in the process involves shaping a flat metal blank into a cup or a can body by a drawing operation or by a drawing operation followed by a ironing operation for reducing the thickness of the sidewalls of the container. In this initial step, the container is formed without a flange at its open top.

In the second operation, the container is redrawn to reduce the diameter to that desired for the finished can body. In this second step, the peripheral edge portion of the bottom wall of the container is clamped and slip held, and the drawing continued until only the marginal portion adjacent the open end remains clamped and the can body has the desired final height. The clamped portion forms a generally radially extending flange which, due to various factors in the drawing operation, has an uneven peripheral edge portion. Because of the uneven edge portion, a flange having a radial extent substantially greater than that required for a closure attachment panel is retained.

In accordance with the present invention, the one-piece drawn can body having the outwardly extending flange containing excess flange metal is then trimmed to the diameter required for the closure attachment flange. This trimming operation may be accomplished in a single step, indicated as a fly trim step or alternatively an initial die cut may be made to remove segments of the excess flange material and thereafter a fly trimming step may complete the trimming operation. The term fly trim is used herein to designate a trimming operation completed by rotary trimmers, or cutters, as distinguished from a conventional reciprocating die cut apparatus previously employed to trim excess material from the flange of a drawn one-piece can body.

Apparatus for forming a one-piece can body by initially drawing a flat metal blank into a cup, ironing the sidewalls of the cup to increase the cup's height and reduce the thickness of the sidewalls, and thereafter redrawing the ironed cup to reduce the diameter and produce a flanged container such as that shown in FIG. 2 is disclosed in U.S. Pat. No. 3,855,862, reference to which may be made for a more complete description of this process, and the disclosure of which patent in this respect is incorporated herein by reference. It is pointed out, however, that various other know apparatus may be employed to produce a drawn one-piece container having an uneven outwardly extending flange at its open end, which flange must be trimmed prior to attachment of a closure panel. It is also pointed out that the well-known problems of removing scrap severed in the form of an annular trim ring is not solved by U.S. Pat. No. 3,855,862.

A one-piece drawn can body formed by a process as described above is illustrated in FIG. 2 and designated generally by the reference numeral 10. Drawn can 10 has a cylindrical body portion 12 and an outwardly directed flange 14 having a width, in the radial direction of the can, which is substantially greater than desired for a closure attachment flange. The peripheral edge 16 of flange 14 is generally uneven as a result of unavoidable variation in lubrication, metal surface, metal irregularities, and the like which affect the drawing operation. The excess metal in flange 16 is removed, in accordance with the present invention, by trimming the flange along a trim line 18 shown in FIG. 3.

The preferred embodiment of the trimming apparatus, designated generally by the reference numeral 20, is shown in FIGS. 4-9 and includes a base plate 22 adapted to be mounted downstream from the drawing apparatus in the can production line schematically illustrated in FIG. 1. A first pair of pillow blocks 24, 26 mounted on the top surface of base plate 22 journal a first cutter shaft 28 for rotation about a horizontal axis spaced above the top surface of the base plate. A second pair of pillow blocks 30, 32 journal a second cutter shaft 34 for rotation in spaced parallel relation to and in the same horizontal plane with cutter shaft 28. Cap screws 36 extend through the respective pillow blocks and are threaded into openings in the base plate to securely anchor the respective pillow blocks in fixed position.

A first cutter plate support housing 38 is fixed, as by key 40, on shaft 28 for rotation therewith between pillow blocks 24, 26, and a second, substantially identical cutter plate support housing 42 is similarly mounted on shaft 34 by key 44. Support housings 38 and 42 each include a generally cylindrical, hollow body portion 46 for receiving their respective supporting shafts, and an outwardly projecting arm 48. Arms 48 each have a flat surface 50 located in a plane parallel to and spaced slightly to one side of the axis of rotation of the associated supporting shaft. A generally arcuate notch 52 is formed in the projecting end of each of the arms 48 as best seen in FIG. 4. The notches 52 have a radius of curvature slightly greater than the radius of the trim line 18 on the flange of a can to be trimmed. As shown in FIG. 8 the arms 48 each have a length such that they extend from their respective supporting shafts a distance slightly less than one half the distance between the two shafts.

A pair of substantially flat cutter plates 54 are rigidly mounted, as by screws not shown, one on the flat surface 50 of each arm 48. Cutter plates 54 each have an arcuate cutting edge 56 having a radius corresponding to the radius of the trim line 18. Cutter plates 54 are dimensioned such that, when mounted on their respective supporting arms 48 and rotated with shafts 28, 34, their outwardly projecting end portions pass in close proximity to but preferably do not actually contact one another.

An elongated, main drive shaft 60 and a second drive shaft 62 are mounted for rotation about spaced parallel axes beneath base plate 22 by a plurality of substantially identical pillow blocks 64 mounted, as by cap screws 66, on spacer blocks 68 which, in turn, are rigidly secured to the bottom surface of base plate 22. Shaft 60 is supported directly beneath and parallel to shaft 28 and is driven for rotation by suitable motor means, not shown, through a drive chain 70 extending around a sprocket 72 rigidly fixed on the shaft. Shaft 62 extends beneath shaft 34 and is driven in synchronization with shaft 60 by a spur gear 74 mounted on shaft 60 and meshing with an identical spur gear 76 mounted on shaft 62. A pair of double sprockets 78, 80, respectively, are mounted on and driven by shafts 60, 62, respectively, and a corresponding pair of double sprockets 82, 84, respectively, are mounted on the end portions of shafts 28 and 34, respectively. A first pair of chains 86 extend around double sprockets 78 and 82 and a second pair of identical chains 86 extend around sprockets 80 and 84 so that rotation of shaft 60 will drive the cutter shafts 28 and 34 respectively, in opposite directions about their respective axes at equal rates.

Figure 6:
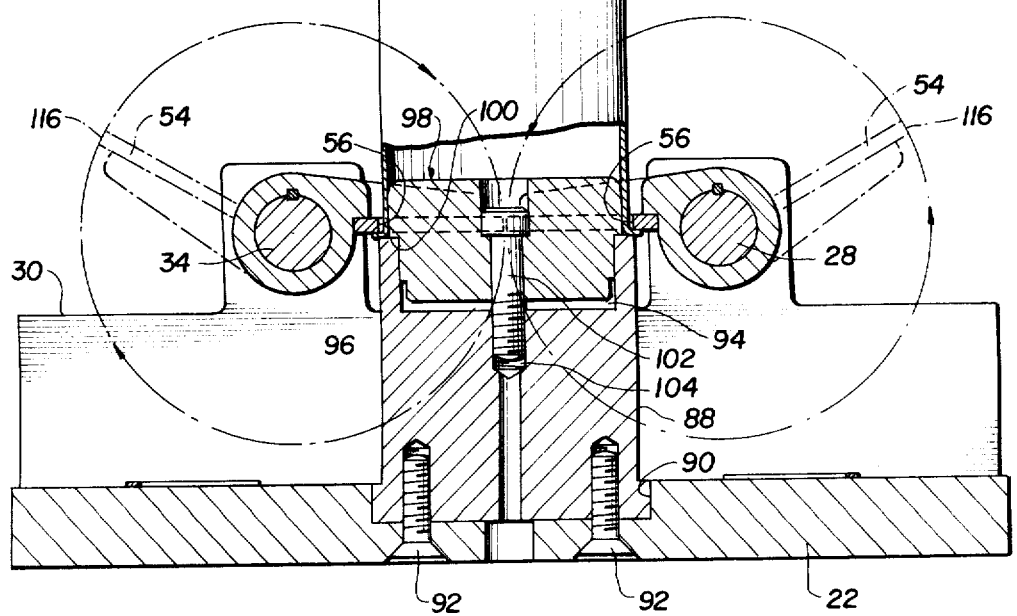
FIG. 6 is a sectional view taken along 6—6 of FIG. 5.

As best seen in FIGS. 6 and 8, an upright support column or post 88 has its base mounted within a pilot recess 90 in the top surface of base plate 22 and is rigidly retained in position by screws 92. The top portion of column 88 is cylindrical and has an external diameter corresponding to the diameter of trim line 18 of a can 10 to be trimmed on the apparatus. An axial bore 94 is formed in the top surface of column 88 to define a cylindrical recess 94 receiving a downwardly directed cylindrical extension 96 on a pilot head or mandrel 98 having a radial shoulder 100 which engages the top flat surface of support column 88. A bolt 102 extends through an axial bore of pilot head 98 and engages a threaded counterbore 104 in support column 88 to rigidly but removably support the pilot head on the support column.

The portion of pilot head 98 which extends above the shoulder 100 has an external diameter corresponding to the internal diameter of the open top end of a can body to be trimmed on the apparatus. Since support column 88 has a diameter larger than the top portion of pilot head 98, i.e., a diameter corresponding to the diameter of the closure attachment flange to be formed on the can, a radially extending shoulder 106 is formed at the top of the support column and surrounding the pilot head in position to engage the inner peripheral portion of the outwardly directed surface of the irregular flange 14 formed at the open top of the can during the drawing operation. As is most apparent from FIG. 6, the outer peripheral edge portion of the top surface of support column 88 acts as a die, cooperating with the arcuate cutting edges 56 of cutter plates 54 to shear the flange 14 along trim line 18 upon rotation of the cutter plates.

Rotation of cutter plates 54 about their respective support shafts is synchronized, as described above, so that the two cutter plates substantially simultaneously engage the portion of a flange 14 to be trimmed from a can body 10 which has previously been inverted and telescoped onto the pilot head 98. Continued rotation of the two cutter plates shears the waste metal from the flange in an annular ring which is carried downwardly in telescoping relation along the support column 88.

Although the bottom surfaces of the cutter plates 54 are illustrated in FIGS. 4 and 6 as being in a substantial coplanar relation at the instant of contact with a flange to be trimmed, it is preferred that the height of the shoulder 106 be such that the top surface of the flange 14 and the bottom surface of cutter plates 54 are not in precise coplanar relation at the instant of such initial contact. For example, shoulder 106 may be slightly lower than necessary for such coplanar relation to exist, whereby initial contact by the cutter plates 54 is at the extreme end portion of the arcuate cutting edge so that the trimming or shearing operation commences at these points and progresses in each direction from opposed sides of the flange until the scrap ring is completely severed. In a preferred embodiment, the bottom surface of the cutter plates 54 may be inclined downwardly at about one-half degree at the time of initial contact with the flange 14. This very slight deviation form the coplanar relation at the instant of initial contact facilitates the trimming action and reduces the shock load on the trimmers while at the same time permitting the scrap ring to, for practical purposes, be removed substantially simultaneously around the entry periphery of the can.

A pair of clipper blocks 108, 110 are mounted one on each side of the support column 88, as by cap screws 112. Clipper blocks 108, 110 are located half-way between and extend generally parallel to the shafts 28 and 34, and terminate at their top in a flat surface 114. Surfaces 114 of clipper blocks 108, 110 have their longitudinal side edges located substantial tangent to the arcuate path of the terminal end portions 116 of cutter arms 54 as best seen in FIG. 8. The top flat surfaces 114 are positioned to engage an annular scrap ring which has been removed from a can as the scrap ring is moved downwardly along the support column 88. Continued rotation of the cutter plates 54, acting in cooperation with the lateral side edges of the flat surface 114, shears the scrap ring into four pieces substantially simultaneously. After cutting, the scrap metal falls by gravity and is easily removed from the apparatus. For example, the scrap may be removed along the top surface of plate 22 by compressed air, or alternatively, suitable openings may be formed in the plate 22 so that the severed scrap may fall into a container therebelow or into a guide chute to be carried to some remote location for collection.

Promptly upon trimming the scrap ring from a container 10 on the pilot head 98, the trimmed container, having an accurately dimensioned closure attachment flange integrally formed on its open end, may be removed and another container immediately mounted on the pilot head in position for trimming. Conventional container handling means may be employed to move the containers onto and off of the pilot head, or alternatively the containers may be positioned in and removed from the trimming apparatus manually. Fully automatic, high-speed handling apparatus is available for use in connection with the trimming apparatus when installed in a high-speed can making line. It is also contemplated that a plurality of pilot heads may be provided for movement in sequence past a number of work stations including a work receiving station where a can is positioned on the pilot head and a trimming station between the two rotary cutters just described. In an alternative embodiment to be described below, the pilot heads may be moved past two trimming stations in succession before the trimmed can body is removed.

In the alternative embodiment of the invention illustrated in FIGS. 9-13 the scrap metal portion of the drawn flange 14 is initially removed in four segments and the clipper blocks 108, 110 are not used. In the preferred method of operation of this alternative embodiment, two segments 116, 118 of flange 14 are initially removed from opposite sides of the can body by severing the segments along lines 120, 122 respectively extending parallel to one another and tangent to the trim line 18 at diametrically opposed points as shown in FIGS. 11 and 12. Removal of scrap segments 116, 118 is preferably accomplished in a second fly trim operation similar to that described above but in which a straight edge 124 on a cutting plate 126 is mounted for rotation on a cutter plate support arm 128. Cutting edge 124 cooperates with a straight edge 130 on a shoulder 132 of a central support column 134. While only one cutter plate 126 and one cutter plate support arm 128 are illustrated in FIGS. 9 and 10, it is understood that two such rotating cutting assemblies would be used, one on each side of support column 134. The two cutter assemblies are rotated in synchronization with one another about their respective support shafts in the manner described above with regard to FIGS. 4-8. As soon as the cutting edges 124 pass the shoulder 132, the can body having the initially trimmed flange as shown in FIG. 12 can be advanced to the second trimming station where the remaining scrap portion of flange 114 is removed in two segments on the apparatus illustrated in FIG. 13. This apparatus is substantially identical with that described above with regard to FIGS. 4-8 with the exception that the clipper blocks 108, 110 are not required and preferably are not employed. Since the structure of FIG. 13 is substantially identical with that previously described, like reference numerals are employed on corresponding parts of the two embodiments and the apparatus shown in FIG. 13 will not be described in detail.

In a further modification of this alternative embodiment of the invention, it is contemplated that the initial trimming operation may be performed as a die cut operation at the conclusion of the final draw step. Thereafter, the severed scrap segments 116, 118 can be removed from the drawing apparatus, as by use of compressed air, and the partially trimmed can body removed from the drawing apparatus and advanced to the final fly trim apparatus of FIG. 13 and the trimming operation completed in a manner just described.

While I have disclosed and described preferred embodiments of the invention, I wish it understood that I do not intend to be restricted solely thereto, but rather that I do intend to include all embodiments thereof which would be apparent to one skilled in the art and which come within the spirit and scope of my invention.

I claim:

1. In a method of forming a one-piece metal can body having an outwardly directed closure attachment flange at its open end by initially deep-drawing a flat metal blank into a one-piece can body having an outwardly directed flange at its open end and subsequently trimming the excess metal from said outwardly directed flange leaving the closure attachment flange on the open end of the can body, the improvement comprising the steps of supporting the open end of the drawn can body in position to be trimmed with the inner peripheral portion of the outwardly directed flange in abutting relation with an annular shoulder having a diameter, corresponding to the diameter of the closure attachment flange supporting a plurality of first rotary cutters for rotations about spaced axes disposed in a plane perpendicular to the longitudinal axis of the can body, the first rotary cutters each having a concave arcuate cutting edge having a radius corresponding to the desired radius of the closure attachment flange, the arcuate cutting edges having a combined length substantially equal to the periphery of the closure attachment flange, and driving said first rotary cutters for rotation around their respective axes to substantially simultaneously engage and trim the outwardly directed flange along a trim line defining the peripheral edge of the closure attachment flange.

2. The method defined in claim 1 wherein the open end of the can body is positioned on a pilot head, said shoulder surrounding the pilot head and having a diameter corresponding to the diameter of the closure attachment flange, and wherein said shoulder and the arcuate cutting edges cooperate to trim the outwardly directed flange in a shearing operation.

3. The method defined in claim 2 wherein the pilot head extends generally vertically and has a free upper end, and wherein the can to be trimmed is positioned open end down on the free upper end of the pilot head.

4. The method as defined in claim 3 wherein the excess metal is trimmed from the outwardly directed flange in a continuous, annular scrap ring, and wherein the scrap ring is subsequently severed into a plurality of pieces by cooperation of the first rotary cutters and stationary clipper means spaced below the shoulder surrounding the pilot head.

5. The method defined in claim 4 wherein the first rotary cutters comprise a pair of rotary cutters rotated in opposite directions about spaced parallel axes located on opposite sides of the pilot head, the pair of cutters each having a substantially semicircular cutting edge.

6. The method as defined in claim 1 wherein the excess metal is trimmed from the outwardly directed flange in a continuous, annular scrap ring, and wherein the scrap ring is subsequently severed into a plurality of pieces by cooperation of the first rotary cutters and stationary clipper means spaced below the shoulder.

7. The method defined in claim 6 wherein the first rotary cutters comprise a pair of rotary cutters rotated in opposite directions about spaced parallel axes located on opposite sides of the pilot head, the pair of cutters each having a substantially semicircular cutting edge.

8. The method defined in claim 1 wherein the first rotary cutters comprise a pair of rotary cutters rotated in opposite directions about spaced parallel axes located on opposite sides of a can in position to be trimmed, the pair of cutters each having a substantially semicircular cutting edge.

9. The method defined in claim 1 further comprising the step of initially severing at least two discrete sections of the waste metal from the outwardly directed flange at spaced positions around the can body and along lines contacting but not extending radially inward of said trimline, and thereafter completing the trimming operation by said first rotary cutters.

10. The method defined in claim 9 wherein said first rotary cutters each engage and sever the complete section of the waste flange metal between two of said discrete sections initially trimmed.

11. The method of claim 9 wherein the initially removed discrete sections are severed from said outwardly directed flange along straight lines tangent to said trimline.

12. The method defined in claim 11 wherein the step of initially severing said discrete sections comprises the steps of positioning the open end of a can to be trimmed between a second plurality of rotary cutters each having a substantially straight cutting edge, and rotating said second plurality of cutters to substantially simultaneously engage and sever said at least two discrete sections.

13. The method as defined in claim 12 wherein the step of initially severing said at least two discrete sections comprises supporting the open end of a can to be trimmed between a pair of said second rotary cutters rotated in opposite directions about spaced parallel axis located on opposite sides of the can to be trimmed.

14. The method defined in claim 13 wherein said first rotary cutters each engage and sever the complete section of the waste flange metal between two of said discrete sections initially trimmed.

15. The method as defined in claim 14 wherein the step of initially severing said at least two discrete sections comprises supporting the open end of a can to be trimmed between a pair of said second rotary cutters rotated in opposite directions about spaced parallel axes located on opposite sides of the can to be trimmed.

16. A method of forming a one-piece drawn metal container having a flange at its open end, the method comprising the steps of
deep drawing a flat metal blank into a one-piece container body having an outwardly directed flange at its open end, said outwardly directed flange having a transverse width greater than required for the flange on the container,
telescoping the open end of the drawn can body onto a pilot head and supporting the outer surface of said outwardly directed flange on a support shoulder surrounding said pilot head, the shoulder having a width corresponding to the desired width of the closure attachment flange, and
trimming the outwardly directed flange to the desired width of the closure attachment flange by a plurality of rotating cutters each having a cutting edge shaped to conform to the contour of a segment of the outer periphery of the flange on the container, said cutting edges cooperating with one another and with the shoulder to trim the outwardly directed flange along a trim line defining the outer periphery of the container flange.

17. The method defined in claim 16 wherein said metal container has a substantially circular cross section and has a circular flange at its open top end, and wherein the step of trimming the outwardly directed flange comprises trimming the flange by a pair of rotating cutters rotated in opposite directions about spaced parallel axes located on opposite sides of the pilot head, the pair of rotary cutters each having a substantially semicircular cutting edge.

18. The method as defined in claim 17 wherein the excess metal is trimmed from the outwardly directed flange in a continuous, annular scrap ring, and wherein the scrap ring is subsequently severed into a plurality of pieces by cooperation of the first rotary cutters and stationary clipper means spaced below the shoulder surrounding the pilot head.

19. The method defined in claim 18 further comprising the step of initially severing at least two discrete sections of the waste metal from the outwardly directed flange at spaced positions around the container body and along lines contacting but not extending radially inward of said trim line, and thereafter completing the trimming operation by said first rotary cutters.

20. For use in the production of drawn container bodies having a flange at their open end by drawing a flat metal blank into a one-piece container body of the desired height and leaving excess metal in an outwardly directed flange at the open end, then trimming the excess metal from the flange to leave a flange of the desired dimension, trimming apparatus comprising, in combination, container support means including pilot means adapted to telescopingly engage the open end portion of and radially position a container body and stop means extending radially from a can body supported by said pilot means, said stop means being positioned to engage and support the outwardly directed flange to axially position the open end of a container on said pilot means, said stop means having a diameter corresponding to the desired diameter of the flange and terminating at its outer periphery in a stationary cutting edge, rotary cutter means including a plurality of cutter members each having a contoured cutting edge, the contour of the cutting edge of each cutter member corresponding to the contour of the outer peripheral edge of a portion of the flange and of the stationary cutting edge on said stop means, shaft means supporting said cutter members for rotation about spaced axes located in a plane perpendicular to the longitudinal axis of a container supported on said pilot means, and drive means for rotating said plurality of cutter members about their respective axes to engage the outwardly directed flange on a container positioned on said means, said cutter members cooperating with said stationary cutting edge to trim the excess metal from the outwardly directed flange around its entire periphery.

21. The trimming apparatus defined in claim 20 wherein said drive means includes means for rotating said plurality of cutters in synchronization with one another to engage said outwardly directed flange substantially simultaneously.

22. The trimming apparatus defined in claim 21 wherein said rotary cutter means comprises a pair of said cutter members supported one on each of a pair of spaced parallel shafts positioned on opposite sides of said pilot means, said cutter members each having a cutting edge contoured to correspond to the flange on the trimmed container around substantially one half the periphery of the flange.

23. The trimming apparatus defined in claim 22 wherein the container is a deep drawn one-piece can body having a circular closure attachment flange at its open end, and wherein each of said cutter members have substantially semicircular cutting edges.

24. The trimming apparatus defined in claim 20 wherein said pilot head is cylindrical in cross section and extends upwardly from said shoulder and terminates in a free upper end for receiving the downwardly directed open end of an inverted container body, said container support means further including a support post extending downwardly from said shoulder and supporting said pilot head in fixed position relative to said shaft means, said rotary cutter means being adapted to remove excess metal from the outwardly directed flange in an annular scrap ring and to propel the scrap ring downwardly in telescoping relation along said post means.

25. The trimming apparatus defined in claim 24 further comprising clipper block/means supported below and projecting outwardly from said radially extending stop means, said clipper means including a pair of cutting edges extending parallel to one another and to the axis of rotation of said pair of shafts, said pair of cutting edges on said clipper means being positioned to engage an annular scrap ring removed from a can body and cooperate with said cutter members to sever said annular scrap ring into a plurality of pieces.

26. The trimming apparatus defined in claim 23 further comprising a second pair of cutter members, second support means for engaging and positioning the outwardly directed flange on a can body relative to said second pair of cutter members and means actuating said second pair of cutter members to sever two discrete segments of the outwardly directed flange on a can body on said second support means, said discrete segments being severed along lines tangent to the peripheral edge of a closure attachment flange to be formed on the can body prior to final trimming of the outwardly extending flange by said rotary cutter means whereby the scrap metal removed by said rotary cutter means is severed in two discrete sections.

27. The trimming apparatus defined in claim 26 wherein said second pair of cutter members comprise rotary cutters each supported for rotation about spaced parallel axes extending on opposite sides of said second support means, said second cutter members each having a substantially straight cutting edge.

* * * * *